(12) United States Patent
Smulson

(10) Patent No.: US 6,248,199 B1
(45) Date of Patent: Jun. 19, 2001

(54) METHOD FOR THE CONTINUOUS FABRICATION OF ACCESS CONTROL AND IDENTIFICATION CARDS WITH EMBEDDED ELECTRONICS OR OTHER ELEMENTS

(75) Inventor: Joel R. Smulson, Calabasas, CA (US)

(73) Assignee: Soundcraft, Inc., Chatsworth, CA (US)

( * ) Notice: Subject to any disclaimer, the term of this patent is extended or adjusted under 35 U.S.C. 154(b) by 0 days.

(21) Appl. No.: 09/299,944

(22) Filed: Apr. 26, 1999

(51) Int. Cl.[7] .................................................. B29C 47/02
(52) U.S. Cl. ............................ 156/244.12; 156/244.19; 156/298
(58) Field of Search ................................. 156/242, 243, 156/244.11, 244.12, 244.19, 150, 151, 290, 293, 298, 500, 552; 257/679; 264/272.11, 272.14, 272.17, 279.1

(56) References Cited

U.S. PATENT DOCUMENTS

| | | | |
|---|---|---|---|
| 3,915,780 | * 10/1975 | Broussand, Jr. et al. | 156/244 |
| 4,380,699 | 4/1983 | Monnier et al. | 235/792 |
| 4,682,794 | 7/1987 | Margolin | 283/82 |
| 4,921,160 | 5/1990 | Flynn et al. | 235/492 |
| 4,978,638 | 12/1990 | Buller et al. | 437/209 |
| 5,229,218 | 7/1993 | Dobreski | 428/516 |
| 5,358,582 | 10/1994 | Koshizuka et al. | 156/235 |
| 5,394,609 | 3/1995 | Ferguson et al. | 29/840 |
| 5,506,751 | 4/1996 | Chatel | 361/690 |
| 5,543,008 | 8/1996 | Hidber et al. | 156/229 |
| 5,772,827 | * 6/1998 | Malm | 156/244.11 |
| 5,779,839 | 7/1998 | Tuttle et al. | 156/213 |
| 5,817,207 | 10/1998 | Leighton | 156/298 |
| 5,830,561 | 11/1998 | Hagner | 428/195 |
| 5,835,545 | 11/1998 | Clocher et al. | 361/719 |

* cited by examiner

Primary Examiner—Michael W. Ball
Assistant Examiner—John T. Haran
(74) Attorney, Agent, or Firm—Natan Epstein; Beehler & Pavitt

(57) ABSTRACT

Cards, labels and the like containing embedded microcircuits or other elements are fabricated in a continuous process by introducing microcircuits between ribbons of extruded material, pressing the ribbons into adhesion with each other while in a plastic state thereby to make a continuous composite sheet containing the microcircuits, cooling the composite sheet to solidify the extrudate material, and cutting out cards from the composite sheet, each card containing a microcircuit. The microcircuits may be introduced between the extruded ribbons on a continuous carrier sheet which may also serve as a printed circuit substrate for the microcircuits. Alternatively, the microcircuits are inserted as discrete units between the extruded ribbons by a suitable robotic device.

1 Claim, 3 Drawing Sheets

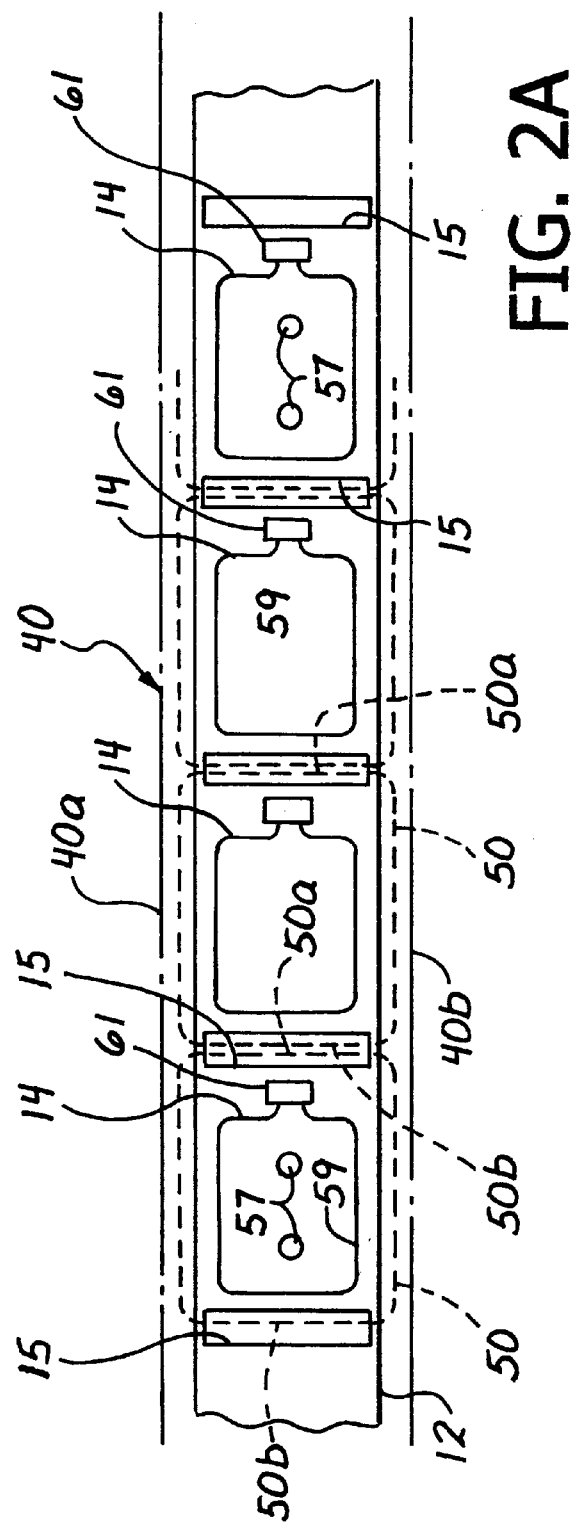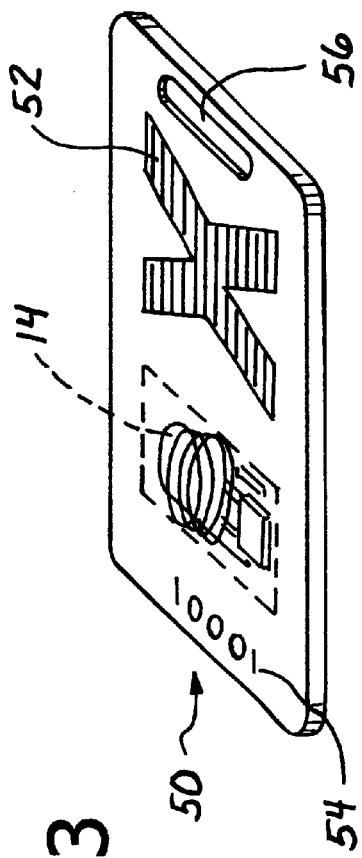
FIG. 2A
FIG. 3

METHOD FOR THE CONTINUOUS FABRICATION OF ACCESS CONTROL AND IDENTIFICATION CARDS WITH EMBEDDED ELECTRONICS OR OTHER ELEMENTS

BACKGROUND OF THE INVENTION

1. Field of the Invention

This invention relates generally to the field of cards, labels or other planar and laminar structures containing embedded devices interactive with external readers such as electronic access control or identification card readers, and more particularly concerns a method of continuously manufacturing such cards, labels and structures.

2. State of the Prior Art

The use of plastic cards as carriers for embedded electronic, magnetic or other interactive devices has grown and continues to grow at a rapid pace. Early key cards contained magnetic coding elements such as barium ferrite and Wiegand wire elements, and such cards are still in widespread use. These cards are inserted into a card reader unit equipped with appropriate sensors which, upon detecting a correct card coding pattern, grant access to protected premises or equipment to the card holder. Advances in solid state electronics and large scale integrated circuit design have produced relatively complex microcircuits or chips suitable for encapsulation in thin card structures. These chips have greatly increased the capabilities of the cards. One area of improvement has been the incorporation of programmable data storage and data processing in the card, leading to so called smart cards used, for example, as refillable cash cards for consumer purchases. Another area of improvement is the development of radio frequency communication between the card and the card reader, resulting in so called non-contact or proximity cards. A principal application of this technology is in radio frequency identification (RFID) proximity cards which incorporate radio frequency transponder integrated circuits or chips. By combining these two technologies non-contact smart cards have been developed more recently. Furthermore, these technologies are not limited to access control or financial transaction cards. Other uses include interactive labels on shipping or storage crates, pallets and other containers to automate and speed-up routing and processing of goods in transit and inventory control of stored goods. Such labels may be plastic sheet structures containing RFID transponder tag integrated circuit chips which cooperate with proximity tag readers. The labels may be programmable with data such as container content, dates, destination, etc. Other uses for such interactive cards and labels are still being found, so that this invention is directed broadly to laminar assemblies with embedded interactive elements, without limitation to any particular use or application of the laminar assembly.

A great deal of effort and innovation has been directed to the problem of economically manufacturing such plastic carrier cards. The large volume, low cost manufacture of carrier cards with embedded electronic elements is more difficult than may appear at first thought. Standardization of the carrier cards has resulted in tight dimensional tolerances including card thickness. There is also increasing demand for ever thinner cards, approaching the thickness of magnetic stripe credit cards, while still containing the embedded interactive electronics including in some cases microprocessor chips. Along with the dimensional requirements is a demand for high quality appearance and finish of these cards. The ability to deliver a choice of surface texture and full color graphics on the card is necessary for competitive participation in this market. Company logos and user information including photographic identification may be applied to the card.

One common approach has been to use a core sheet of sufficient thickness in which are cut openings for receiving the electronic components. The core is laminated between top and bottom layers to enclose these components. Onto this assembly may be applied sheets with pre-printed graphics, and these are in turn covered with protective layers which guard the graphics against wear during handling of the card. The openings in the core sheet are filled to hold the components in place and minimize surface irregularities in the finished card. Various processes are available for this purpose including wet chemistry processes, ultraviolet cured epoxy fillers, self curing fillers, heat cured filler materials, and air cured epoxies among other techniques. These conventional approaches involve many intermediate steps in the manufacture of the cards and require relatively costly and difficult to handle raw materials including very thin plastic sheets of closely controlled thickness. Efforts to simplify card manufacture have been directed to injection molding of carrier cards. Although this method can yield high quality cards it calls for expensive injection molds and production volume is limited by the number of cavities in the molds.

U.S. Pat. No. 5,817,207 to Leighton discloses a hot lamination method whereby a micro-circuit is encapsulated between two discrete sheets of plastic under heat and pressure so that the plastic flows around the electronic device. While in principle this method eliminates the need for a separate core sheet with cut out openings for receiving the microcircuit, it is a very difficult process to carry out in practice and still requires considerable handling and cutting of plastic sheets and loading these into the lamination press one at a time.

In spite of the rapid growth in usage of interactive cards and labels, existing technology for the economical manufacture of those items has failed to keep pace with demand. A continuing need exists for a lower cost method of high volume manufacture of laminar structures, such as cards and labels, with embedded interactive or other elements.

SUMMARY OF THE INVENTION

In response to the aforementioned need this invention provides a method for the continuous fabrication of cards or labels containing embedded microcircuits or other interactive elements by extruding continuous upper and lower layers of hot extrudate material, introducing the microcircuit between the upper and lower layers at spaced locations therealong, pressing the upper and lower layers into adhesion with each other while in a plastic state thereby to make a continuous composite sheet having an upper surface and a lower surface and containing the microcircuits suspended in the extrudate material in spaced relationship to both the upper surface and the lower surface, cooling the composite sheet to solidify the hot extrudate material, and cutting out card blanks from the composite sheet, each card blank containing a microcircuit which is preferably consistently positioned from one card blank to the next.

In one form of the invention the microcircuits are introduced between the upper and lower extrudate layers on a continuous carrier sheet, which may be an apertured web permitting adhesive contact between the upper and lower extrudate layers through openings in the web sheet. The carrier sheet may also serve as a substrate for printed circuits interconnecting circuit components in each of the microcircuits.

In another form of the invention the microcircuits are introduced one by one in discrete fashion between the extrudate layers, as by a vacuum pick and place robotic device. Each of the microcircuits may include a number of circuit components, such as an antenna coil connected to an R.F. transponder microchip. The circuit components may be mounted on a printed circuit substrate such as a printed circuit etched on a thin flexible polyester sheet, or may be naked components with interconnected terminals and no other support, such as an antenna air coil directly connected to a transponder I.C. chip.

Secondary operations may include calendaring the continuous composite sheet thereby to achieve a controlled thickness of the composite sheet and of the card blanks, embossing the continuous sheet thereby to apply a desired surface finish to one or both of the upper surface and the lower surface, printing graphic images on one or both of the upper surface and the lower surface before or after cutting out the card blanks, and punching one or more holes in the continuous sheet in given relationship to each of the microcircuits such that each card blank is cut out with one or more prepunched holes.

Although the extrudate material is not limited to any particular class of materials it is presently contemplated that a synthetic plastic will be employed for this purpose and more specifically the extrudate material is selected from the group consisting of polyvinylchloride, chlorinated polyvinylchloride, polycarbonate, ABS (acetobutylene styrene), nylon and Teflon. The carrier sheet may be of any suitable material such as polyester, F4 glass fiber sheet, PVC, acetate, nylon or Teflon, among other possibilities.

These and other advantages, features and improvements will be better understood from the following detailed description of the preferred embodiments taken in conjunction with the accompanying drawings.

BRIEF DESCRIPTION OF THE DRAWINGS

FIG. 2A is a plan view of a typical composite sheet 40 containing embedded microcircuits 14;

FIG. 3 is a perspective view of a typical finished access control card;

DETAILED DESCRIPTION OF THE PREFERRED EMBODIMENTS

Figure 1:
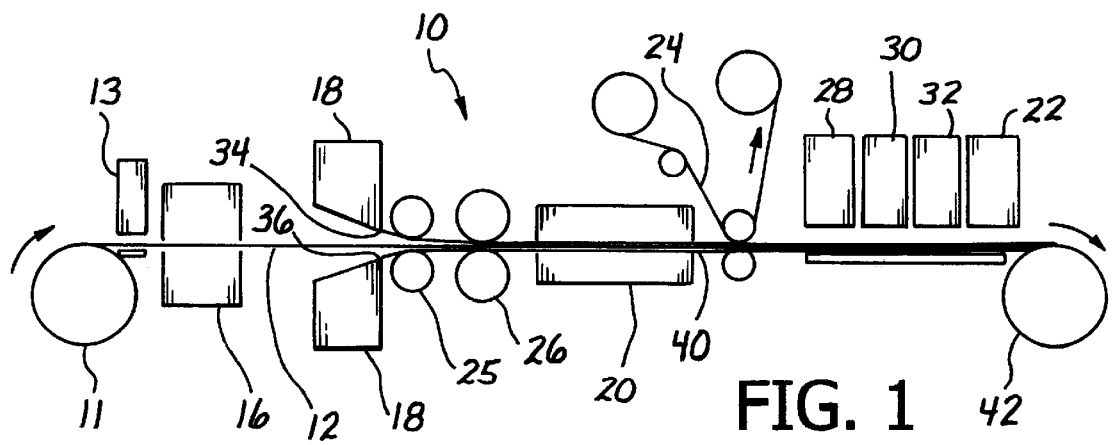
FIG. 1 is a schematic depiction of the apparatus arranged for practicing the continuous fabrication method of this invention.

With reference to the accompanying drawings wherein like elements are designated by like numerals, FIG. 1 shows a production line generally designated by numeral 10, for the continuous fabrication of access control cards or labels with embedded electronics according to this invention. A web supply roll 11 provides a continuous supply of a web sheet 12 on which have been mounted at regularly spaced intervals microcircuits 14 to be embedded in the access control cards. For example, circuits 14 may be radio frequency identification transponder circuits including one or more integrated circuit chips connected to external components such as an antenna coil and capacitors, all mounted on a common printed circuit substrate. However, the term microcircuits is here used broadly and is intended to include any elements whether electronic, magnetic or any other elements or devices, active or passive, which are embedded in a plastic carrier card for any purpose whatsoever. For purposes of this disclosure the term microcircuit is used to designate any device or electronic circuit which cooperates or interacts with another electronic reader system.

The production line 10 includes an optional preheating oven 16, a dual extrusion die 18, a pair of pincher rollers 25, a cooling tank 20 and a cutting press 22 such as a punch press. Depending on the particular cards being produced one or more secondary operation stations may be added such as magnetic stripe applicator 24, embossing or calendaring rollers 26, graphics printing station 28, card numbering press 30 and hole punch 32.

Figure 2:
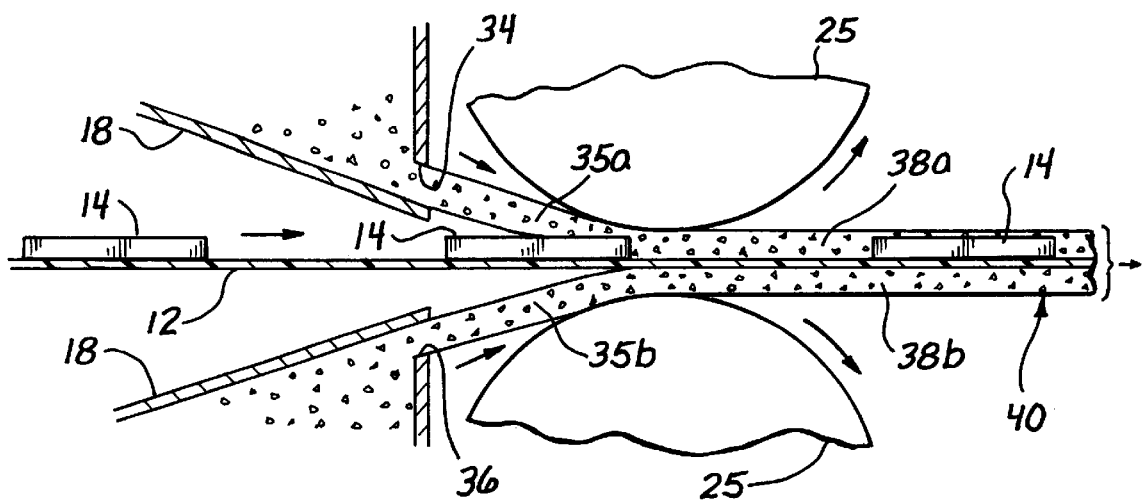
FIG. 2 is an enlarged cross sectional detail view showing the upper and lower extruder nozzles applying corresponding upper and lower layers of extrudate to a continuous carrier sheet or web bearing electronic microcircuits.

The web 12 passes through preheating oven 16, through dual extrusion die 18 between an upper extrusion nozzle 34 and a lower extrusion nozzle 36, and between pincher rollers 25, as better seen in FIG. 2. Each nozzle typically is a slit opening dimensioned to produce a ribbon of desired width and thickness. Each nozzle 34, 36 extrudes a continuous ribbon 35a, 35b of heated material in a semi-molten plastic state. The extrusion nozzles are at a 45° angle, oriented in the direction of advance of the web sheet 12, and are positioned so that the two ribbons pass between a pair of pincher rollers 25 above and below the carrier sheet 12. The hot extrudate is driven through the nozzles 34, 36 by pressure applied to the molten material in the heated die cavities . Pincher rollers 25 downstream of the extrusion nozzles press the still hot and viscous extrudate ribbons together and against the carrier sheet 12 including microcircuits 14 as the circuits pass between nozzles 34, 36, to form a continuous composite sheet 40 having upper and lower layers 38a, 38b of extrudate material and containing carrier sheet 12 with microcircuits 14. In FIG. 2 three microcircuits 14 are shown at different stages of the encapsulation process. The first microcircuit 14 on the left is being carried on the bare web sheet 12 into the dual extrusion die 18. The middle microcircuit 14 is entering the pinch area between the upper and lower extrudate ribbons 35a, 35b and has been partially encapsulated. The microcircuit 14 on the right hand side has passed between the pincher rollers 25 and has been fully encapsulated in the hot extrudate material. The hot composite sheet 40 is passed through a cooling water tank 20 where the extrudate is cooled to a solid state. The solidified composite sheet 40 is continuously drawn by a puller device such as a pair of driven pincher rollers (not shown in the drawings) downstream of the cooling tank 20 or a large diameter collection drum 42 at the end of the production line 10. The puller device applies continuous controlled pulling force on the ribbons as the hot extrudate emerges from the nozzle openings and on the web sheet. The web sheet 12 is pulled in this fashion through the dual extrusion die 18 and between the extrusion nozzles 34, 36 along with the extrudate ribbons 35a, 35b. The pulling rate is calculated to pull the extrudate ribbons at the same rate as the ribbons are extruded from the nozzles, and to pull the carrier sheet 12 at this same rate.

The thickness of the upper ribbon 38a extruded by the die nozzle 34 is greater than the thickness of the microcircuits 14 on the web sheet 12 so that the microcircuits 14 are fully covered and encapsulated in the extrudate material. The viscosity of the extrudate is controlled by means well understood in the trade so that the material flows onto all sides of the circuit 14 and closely encapsulates the microcircuits. The carrier sheet 12 is preferably apertured by perforations in the sheet to permit partial flow-through of hot extrudate and actual contact between the upper and lower layers 38a, 38b of extrudate, so as to assure positive bonding between the extrudate layers and the web sheet. An optional oven 16 may be provided upstream of the dual extrusion die 18 for preheating the carrier sheet 12 and the microcircuits 14 to minimize thermal shock upon contact with the hot extrudate, and so reduce losses of microcircuits to heat damage to improve process yield.

The cooled composite sheet 40 may be collected without further processing in continuous roll form on collection drum 42, to be cut into individual cards and otherwise treated and processed at a later time. Alternatively the punch press 22 cuts out individual cards 50 each containing a microcircuit 14, such as illustrated in FIG. 3, from the continuous sheet 40. The cards 50 are collected in a bin or other suitable collection device (not shown) while the remains of the carrier sheet is collected as scrap, on collection drum 42 or fed into a shredder for recycling. The operation of the punch press 22 is referenced to the position of the individual circuits 14 within the advancing composite sheet so that the individual cards 50 are cut out in register with the embedded circuits 14, i.e. so that the position of the embedded circuits 14 is consistent from card to card. Referencing of the punch press 22 may be achieved by means well understood in the field, such as infrared detection of each embedded circuit 14 ahead of the punch press coupled with rate of movement data derived from a sensor connected to the puller device, so as to time the operation of the punch press 22 with the proper position of the circuit 14 under the punch press. In order to die cut the moving composite sheet 40 either a traveling punch or a conventional accumulator device may be used.

Depending on the type of card, label or similar article being manufactured, one or more secondary operations may be performed as part of this fabrication method. For example a continuous magnetic stripe may be applied to the composite sheet 40 by a magnetic stripe applicator 24, so that each card blank cut from the sheet includes a strip of magnetic material encodable with machine readable digital information. A custom finish may be imparted to one or both surfaces of the card blanks by a pair of embossing rollers 26, such as a polished surface, a wood grain surface, or a matte finish, to name a few possibilities. These two secondary operations are best performed on the continuous composite sheet 40 while it is still in a semi-plastic state, ahead of cooling tank 20, although cold calendaring and embossing are also possible. Additional secondary operations may include application of graphic images such as company logos by a printing station 28. A variety of printing technologies are available for this purpose such as pad printing or die sublimation printers, and is selected according to factors such as desired image quality and cost limitations. Numbering of the cards may done by hot stamping, laser etching or by an ink jet numbering head at station 30 and a hole punch 32 may be included in production line 10 for punching one or more holes, such as key chain holes, in each card blank.

The web sheet 12 may be pre-punched at a punch station 13 ahead of the dual extrusion die 18 to make apertures or openings in the web sheet. These apertures may include transverse slots 15 spaced along the web sheet 12 as shown in FIG. 2A. The side edges 40a, 40b of the composite sheet 40 are suggested in phantom lining in the Figure. The web sheet 12 is shown in solid lining and it is seen that the width of the web sheet is narrower than the width of the composite sheet 40. Each slot 15 is located between consecutive microcircuits along the web sheet and is sized and shaped so as to allow contact between the upper and lower extrudate layers 38a, 38b along at least a portion of the leading and trailing edges 58a, 58b of each consecutive pair of cards 50 (suggested in phantom lining in FIG. 2A) to be cut out from the web sheet. That is, the width of each slot 15 measured along the length of the web sheet is somewhat greater than the spacing between the consecutive cards. This not only allows a margin of contact between the two extrudate layers for good adhesion along all edges of the card, thereby to prevent delamination of the card in use, but also minimizes the edge of the web sheet along the card edges for better esthetic appearance. The length of each slot 15 is somewhat shorter than the width of the web leaving two relatively narrow strips or links 55 connecting each consecutive pair of cards 50, so that in the finished card 50 the web edge shows only along small portions of the card edges. Additional apertures in the web sheet 12 may be punched in a generally central area of the cards 50 for bonding between the upper and lower extrudate layers, such as openings 57 inside an antenna coil 59 connected to integrated circuit chip 61.

FIG. 3 shows a typical access control card 50 made by the method of this invention, with embedded microcircuit 14. The card has a rectangular shape, an imprinted graphic image 52, an imprinted card number 54, and a punched badge dip slot 56. An important advantage of this invention is the ease with which smooth top and bottom surfaces of the card 50 can be obtained, due to the encapsulation of the microcircuit 14 in fluid extrudate material as opposed to the conventional technique of laying sheet material over and under such a circuit. The hot extrudate conforms to the contours of the circuit 14 without residual irregularities on the card surface. If a high degree of precision is desired in the surface smoothness and thickness of the card 50, a pair of calendaring rollers may be provided in lieu of or in addition to the embossing rollers ahead of the cooling tank 20 in FIG. 1. Calendaring of continuous sheet material to achieve tight control of thickness tolerances is well understood in the industry and need not be discussed in greater detail here.

Figure 4:
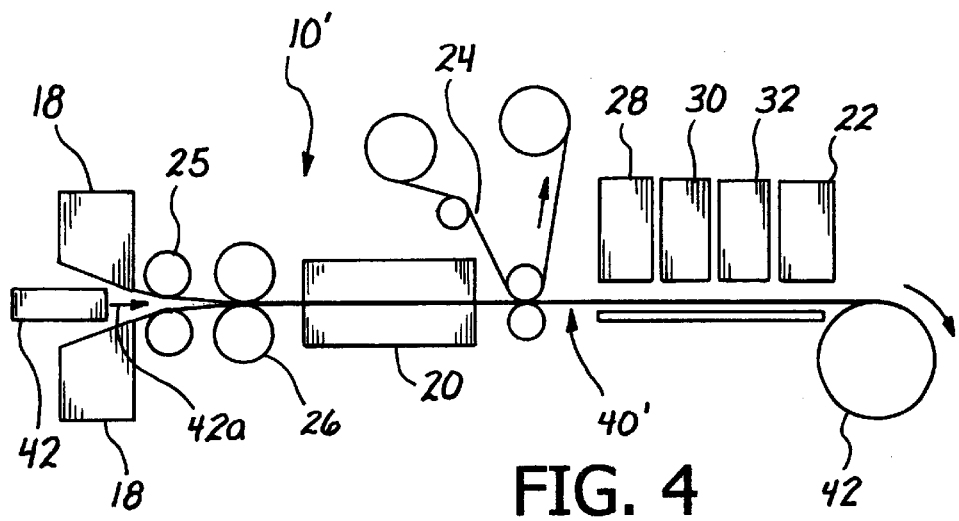
FIG. 4 is a schematic illustration of a production line for webless continuous fabrication of access control cards according to an alternate method of this invention.
Figure 5:
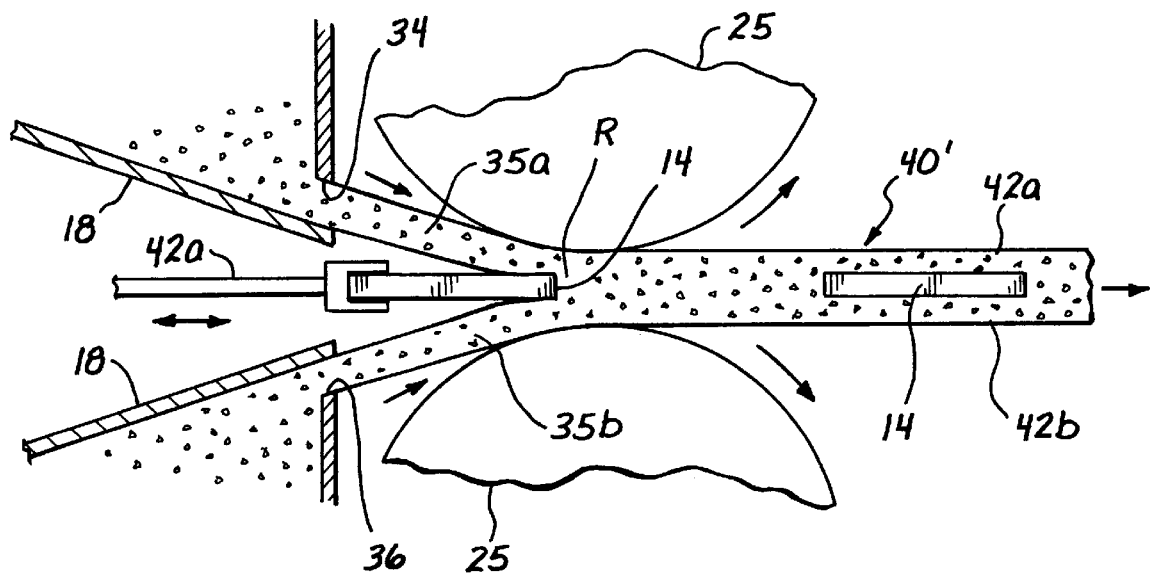
FIG. 5 is an enlarged cross sectional detail view illustrating the webless insertion of discrete microcircuits between upper and lower layers of extrudate.

An alternate embodiment of this invention is shown in FIGS. 4 and 5. The production line 10' of FIG. 4 differs from that of FIG. 1 in that the microcircuits 14 are inserted between layers 38a, 38b of hot extrudate in discrete fashion, i.e. individually and without support from a continuous web Each circuit 14 is pressed into sufficient contact with the extrudate, preferably in the pinch region R where the upper and lower layers 38a, 38b are pressed together between pincher rollers 25 after emerging from the upper and lower nozzles 34, 36 of the dual extrusion die 18, as suggested in FIG. 5. The microcircuits 14 may be inserted one at a time by means of a suitable robotic device such as a vacuum pick-and-place device 42 with robotic arm 42a. When released by the insertion device 42 each microcircuit 14 is carried with the stream of extrudate and, as the continuous ribbons 35a, 35b are pressed together between pincher rollers 25 the microcircuit 14 is captured, coated by and encapsulated between the merging ribbons, and carried within the composite extrudate sheet 40' towards the cooling tank 20.

The microcircuits 14 are typically planar assemblies, i.e., have a main plane with a relatively large surface area. Some microcircuits are mounted on a thin flexible printed circuit substrate sheet. Other circuits 14 may consist of Wiegand strips which are also packaged in planar sheet form. Microcircuit 14 may also consist of only an air coil directly connected to a naked integrated circuit chip such as a radio frequency transponder chip, with no other support or circuit components. Even in such a case the air coil has a planar configuration defining a principal plane of the microcircuit.

According to the alternate method of this invention discrete individual microcircuits 14 are inserted into the extrudate stream in coplanar relationship to the composite sheet 40' formed by the merging extrudate ribbons 35a, 35b. That is, the principal plane of the circuit 14, such as the circuit board plane, lies parallel to the parallel top and bottom surfaces 42a, 42b of the merged extrudate layers. The substantial surface area presented by the principal plane of each microcircuit 14 in a direction transverse to the length of the extruded sheet 40' ensures that the microcircuits have little tendency to drift up or down through the viscous extrudate and will tend to remain at a predictable location intermediate the top and bottom surfaces 42a, 42b of the extruded composite sheet 40'. In effect each microcircuit 14 is self-centering between the top and bottom surfaces of the composite extrudate sheet 40'. Control over the positioning of the circuit between the top and bottom surfaces 42a, 42b may be had by altering the relative thicknesses of the upper and lower extrudate ribbons 35a, 35b by appropriate modification to the dimensions of extrusion nozzles 34, 36. By making the lower layer relatively thin and increasing the thickness of the upper layer 35a, the resulting location of the circuit 14 is shifted closer to the bottom surface 42b of the composite sheet and consequently closer to the bottom surface of the finished card. Conversely, the circuit 14 can be positioned closer to the top surface of the card by diminishing the relative thickness of the upper layer 38a in relation to the lower layer 35b.

The finished cards made according to the alternate method of FIGS. 4 and 5 are essentially similar to the card 50 in FIG. 3 obtained by the webbed method of FIGS. 1 and 2, except for the absence of a web layer in the finished card.

As was mentioned earlier it is particularly desirable to make thin access control cards having a thickness comparable to that of ordinary credit cards. Typical credit card components include a 28 mil thick inner sheet of white PVC plastic and a 1.5 mil clear overlay to protect printed graphics on each side, the three layers laminated under heat and pressure, the resulting laminate being about 31 mils thick. Microcircuits 14 may include so called "flip-chip" integrated circuits having a thickness of the order of 15 to 20 mils, for example, mounted on very thin, e.g. 2 mil thick, flexible printed circuit sheets of Kapton or polyester, for example, with antenna coils etched on the printed circuit sheets. The combined thickness of the extrudate ribbons 35a, 35b need be only slightly greater than the thickness of the microcircuits 14 so as to cover the top and bottom of the microcircuits. In the method of FIGS. 1 and 2 the upper extrudate ribbon 35a must be sufficiently thick to cover the entire thickness of the microcircuits 14, while the lower extrudate ribbon 35b may be relatively thin as it only needs to cover the underside of the carrier sheet 12. If the carrier sheet 12 is perforated, extrudate material from the bottom layer may pass trough the sheet 12 and contribute to adhersion to the top side of the sheet 12. In the alternate method of FIGS. 4 and 5 the upper and lower extrudate ribbons 35a, 35b may be of comparable thickness as there is no carrier sheet between the two layers and each ribbon may contribute about one half the total thickness of the card being made. It is presently preferred that the web 12 be narrower than extrudate layers 38a, 38b and in fact narrower than the width of the cards being made, so that the web sheet does not show along the cut edges of the cards. The extrudate ribbons may be approximately 2.5 inches wide to provide ample margins on either side of a typical 2.125 inch wide card.

An important feature of this invention is that it is very easy to change the thickness of the extrudate ribbons simply by changing nozzles at the extrusion die, a relatively quick procedure, so that cards, labels or other similar items of different thicknesses can be readily fabricated depending on the purpose of the card and the size of the encapsulated microcircuit 14. No inventory of sheet materials needs to be kept on hand or ordered. A continuous range of card thicknesses can be obtained as needed and is not limited by availability of particular sheet thicknesses. As a result it is possible to precisely tailor the card thickness to the encapsulated microcircuit 14 and thereby minimize card thickness for a given microcircuit.

From the foregoing it will be appreciated that a first and an alternate method have been disclosed for the continuous manufacture of access control cards with embedded microcircuits with superior control over card materials, card thickness and surface finish, yet at lower unit cost than is possible today. The disclosed methods provide single step manufacture of the cards and can be implemented on a production line run by a single operator, as opposed to the many step, many operator methods currently practiced.

While particular embodiments of this invention have been described and illustrated for purposes of clarity and explanation it will be understood that many changes, substitutions and modifications to the described embodiments will be apparent to those having no more than ordinary skill in the art without thereby departing from the scope of the following claims.

What is claimed as new is:

1. A method for the continuous fabrication of electronic access control cards, comprising the steps of:

extruding continuous upper and lower layers of hot extrudate material;

introducing a continuous carrier sheet between said upper and lower layers, said carrier sheet bearing microcircuits at spaced locations therealong;

pressing said upper and lower layers into adhesion with each other while in a plastic state thereby to make a composite sheet of substantially constant thickness having an upper and a lower surface and containing said microcircuits suspended in said extrudate material in spaced relationship to both said upper and said lower surface;

cooling said composite sheet to solidify said hot extrudate material; and cutting said composite sheet thereby to cut out access control card blanks containing a microcircuit in substantially consistent relative position in each card blank;

characterized in that said carrier sheet is narrower than said composite sheet and has openings between consecutive ones of said microcircuits in said continuous carrier sheet, said openings having a length somewhat shorter than the width of said carrier sheet and a width measured along the length of said web sheet somewhat greater than the spacing between consecutive ones of said card blanks thereby to allow contact between said upper and lower layers for bonding along all edges of said card and to limit the web edge to show only along small portions of card edges for improved esthetic appearance and prevent delamination of the card in use, and additional openings in said carrier sheet to permit bonding of said upper and lower layers to each other at additional locations between said edges of said card.

* * * * *